United States Patent [19]
Beeloo

[11] 3,793,633
[45] Feb. 19, 1974

[54] ANNUNCIATOR CONTROL SYSTEM WITH ACKNOWLEDGEMENT

[75] Inventor: Leendert A. Beeloo, Los Angeles, Calif.

[73] Assignee: Rotoflow Corporaton, Los Angeles, Calif.

[22] Filed: Apr. 12, 1971

[21] Appl. No.: 133,251

[52] U.S. Cl. .................... 340/213.1 R, 340/415 R
[51] Int. Cl. ......................................... G08b 23/00
[58] Field of Search .................... 340/415 A, 213 R

[56] References Cited
UNITED STATES PATENTS

| | | | |
|---|---|---|---|
| 3,537,089 | 10/1970 | Lee .................................. | 340/213.1 |
| 3,603,948 | 9/1971 | Medlinski ...................... | 340/213 R |
| 3,631,432 | 12/1971 | Stallebrass ...................... | 340/213.2 |
| 3,474,299 | 10/1969 | Caputo .......................... | 340/415 X |
| 3,474,443 | 10/1969 | Lightner ............................ | 340/415 |
| 3,524,185 | 8/1970 | Ehni ................................. | 340/415 |
| 3,582,925 | 6/1971 | Porter ............................ | 340/415 X |
| 3,611,364 | 10/1971 | Jones ................................ | 340/415 |
| 3,624,626 | 11/1971 | MacCreadie ................... | 340/415 X |

*Primary Examiner*—Harold I. Pitts
*Attorney, Agent, or Firm*—Ralph R. Browning

[57] ABSTRACT

An annunciator system comprising: an electrical power source; a plurality of monitoring circuits connected to the power source for monitoring a plurality of conditions; and a lock-out circuit commonly connected to the power source and each of the monitoring circuits. Each of the monitoring circuits may comprise a relay responsive on the presence of an abnormal condition associated with its respective circuit to actuate an indicator device in such respective circuit. The lock-out circuit may comprise a relay responsive on the response of one of the monitoring circuit relays, to an abnormal condition, to connect all monitor relays, except the first responsive one, to the power source, locking them in a non-responsive condition. An acknowledgment switch, which may be provided in the lock-out circuit, is positionable to prevent response of the lock-out circuit relay so as to allow independent response of all of the montoring circuit relays to abnormal conditions.

21 Claims, 1 Drawing Figure

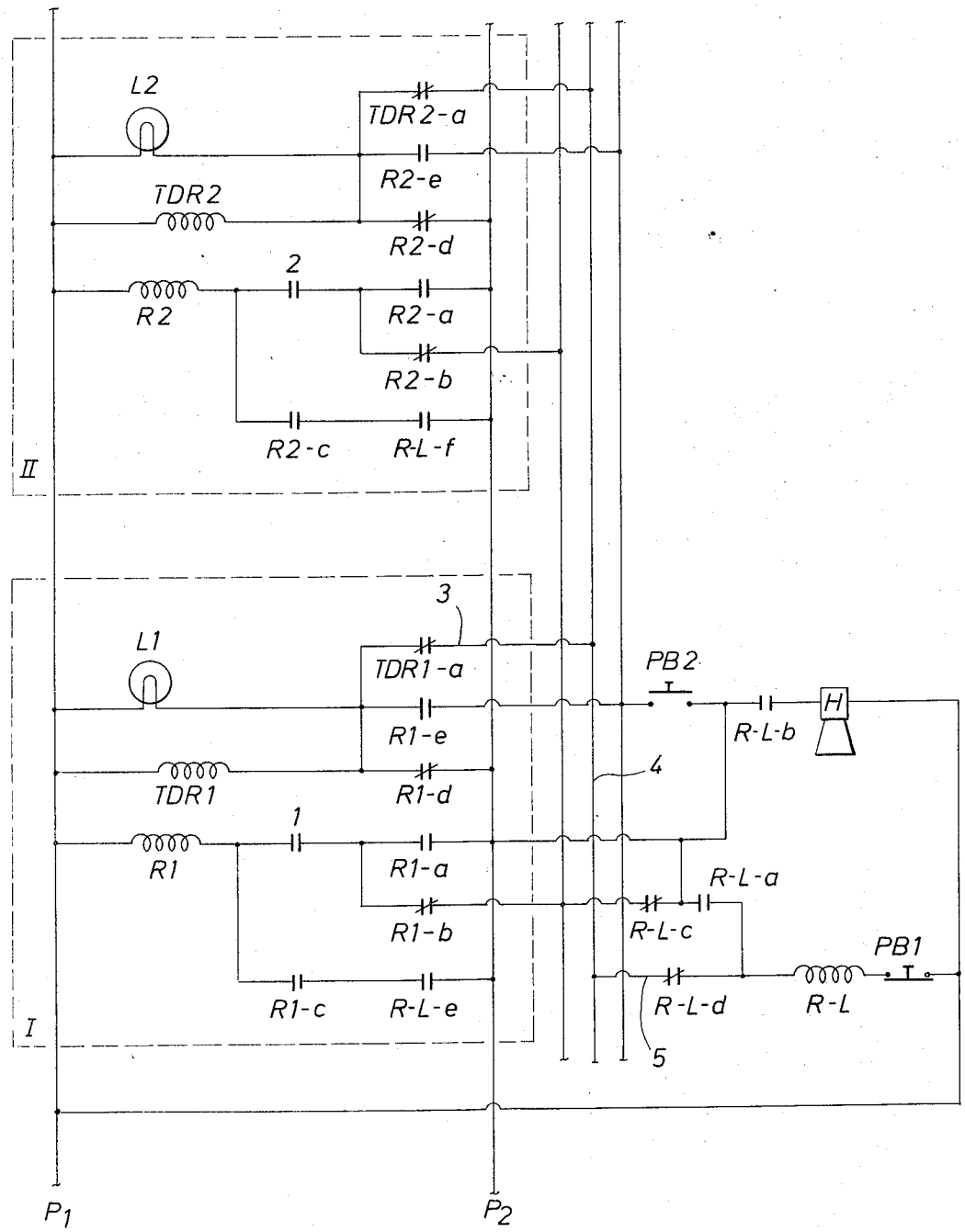

ANNUNCIATOR CONTROL SYSTEM WITH ACKNOWLEDGEMENT

BACKGROUND OF THE INVENTION

1. Field of the Invention

The present invention relates to protective instrumentation systems for machinery. More specifically it relates to an integrated combination of a protective system with an annunciator for indicating "first out" of abnormal conditions.

2. Description of the Prior Art

Machinery and processes often have protective instrumentation such as pressure switches, temperature switches, tachometer, level switches, etc., to provide shutdown signals for the protection of the machinery or process if an abnormal condition occurs. If one of the sensors is activated it may initiate shutdown of the machinery or process and also give an alarm signal such as a horn or blinking light. Such machinery or processes often operate unattended and if an abnormal condition occurs, it is not uncommon for one or more other abnormal conditions to be created. Since several abnormal conditions may activate a number of signals, it is important to know which signal was activated first, to eliminate the basic problem. This may be referred to as "first out" indication.

Abnormal operating conditions may be sensed in such a manner as to illuminate lights or activate other types of signals. For example, a low oil pressure alarm could activate the standby lube oil pump (which locks in to prevent cycling), and the light showing that the lube oil pump is running would then serve as an indication that such an abnormal condition occurred. Since the lube oil pump locks in, one could later observe that this event has taken place because it was still locked in. ("Locked in" means that when the event took place it also initiated an irreversible cycle such as completing a circuit through a relay which has an extra pair of contacts on the relay itself so connected that the relay will not open again until the circuit is broken — as by means of a push button.) Presently used annunciator systems where the "first out" is shown, require extensive wiring installation with separate wiring and relays for each of the signals. One example of a conventional annunciator system is described in U. S. Pat. No. Re.24,031 - Marmorstone. The annunciator system keeps track of the signals and indicates which are activated and which was first. After an acknowledge button is pushed then the special indication of the first is removed. Since the conventional annunciator system requires separate wiring installation, it is relatively expensive.

More recent developments in annunciator systems may be seen in U. S. Pat. Nos. 3,138,791 - Beguin; 3,474,443 -Lightner et al; and 3,500,469 - Plambeck et al. However, for various reasons, including cost, complexity, fail safe operation, etc., a completely satisfactory replacement of the conventional system has not, prior to the present invention, heen found.

SUMMARY OF THE INVENTION

The annunciator of the present invention utilizes a common lockout relay and eliminates the need for a separately wired system, resulting in a significant cost reduction. The present invention utilizes a series of conventional relays each responding to its respective shutdown signal. Each relay is provided with a pair of normally open contacts such that when one closes it initiates the shutdown sequence. A corresponding light on a display panel shows which signals have been actuated. A second pair of contacts on each relay is so connected that the relay is locked in when it receives a signal and is activated. Its respective panel light is illuminated and is not turned off until an acknowledge button is pressed to release the relay from its locked in condition.

Not only is the present invention capable of providing an indication of abnormal conditions, it identifies which conditions occurred first and which conditions still prevail at the time of acknowledgement. An indicator light is provided for each condition which might shut the system down. Also provided is a common relay system which responds to the first signal actuated. The relay system responds in two ways, locking in the light circuit so that no other subsequently occurring shutdown signal will actuate its light or other indicator and locking the relay itself in. When the acknowledge button is pressed all of the emergency light circuits are released and free to respond, no longer being locked out. Therefore any emergency abnormal conditions which are still present, including the one responded to first, are indicated. Thus, the operator may correct those abnormal conditions which still prevail.

BRIEF DESCRIPTION OF THE DRAWING

The only FIGURE of the drawing is a schematic circuit diagram of an annunciator system according to a preferred embodiment of the invention.

DESCRIPTION OF A PREFERRED EMBODIMENT

Referring now to the drawing, a description of the invention will be given for a system having two emergency shutdown signals. The individual circuitry for one is enclosed in the dashed area I and the circuitry for the other is enclosed in the dashed area II. Common circuitry lies outside of these dashed areas. As will be seen hereafter the first abnormal condition to occur will illuminate a signal light, and prevent any subsequently occurring condition from illuminating its light or locking itself in.

For descriptive purposes, it will be assumed that the abnormal condition indicated by the circuitry in area I occurs first. Relay R1 is actuated under normal operation by virtue of the actuating circuit being initiated through station contacts 1, normally closed contact R1-$b$ and normally closed contact R-L-$c$ hence to the power lines $P_1$ - $P_2$. Initial actuation of relay R1 breaks this actuating circuit by opening R1-$b$; but it simultaneously closes contact R1-$a$ which maintains the actuation of relay R1 by establishing a connection directly to the power line $P_2$. Thus, relay R1 is locked in its actuated condition. The relay R1 should be so adjusted that contact R1-$b$ would not be opened any significant length of time before contact R1-$a$ was closed.

Indicator light L1 is on until station contact 1 is closed. Such closure, as described above, causes relay R1 to become actuated (and locked in). Thus contact R1-$d$ is opened and light L1 is turned off (until an emergency breaks contact 1). Additional station contacts and their respective circuitry could be used and would act independently. Although station contact 1 is shown as a normally open contact, it could be a normally closed one. However with the normally open contact it is a "fail safe" energized system.

As stated earlier, one faeature of the inventionrelates to a method for preventing all but the first occurring abnormal condition from illuminating respective signal lights. To accomplish this objective a common relay R-L and time delay relay TDR1 is provided. Any emergency which opens station contact 1 breaks the circuit through relay R1 and, among other things, closes contact R1-d. This illuminates light L1, but more importantly, it actuates common relay R-L(by way of normally closed contacts TDR1-a and R-Ld). This actuation of relay R-L closes contact R-L-a and thereby locks itself in (until the circuit is opened by depression of "acknowledge" button PB1). It opens contact R-L-c which supplies power to relay R1 preventing it from being reactivated by closure of station contact 1 (or a disturbance of any other station contact).

The normally closed contact feature will open invention relates a second or two, not disturbing relay R-L because the latter is locked in through contact R-L-a, and anyway, the initial circuit to relay R-L was immediately broken by the opening of normally closed contact R-L-d. This opening of contact TDR1-a permits use of acknowledge button PB1 to unlock relay R-L so as to silence the horn H and remove the indication of "first out" and to then see what other abnormal conditions are still in effect.

Now referring to the set of circuitry for another abnormal condition, generally shown enclosed in dashed area II, it can be seen that the opening of station contact 2 will not deenergize relay R2 because of the parallel circuit through contacts R2-c and R-L-f. Normally open contacts R2-c and R-L-f are now closed because emergency opening of station contact 1 activated relay R-L as explained heretofore. Thus, the introduction of relay R-L made it possible to lock out all emergency lights except the first one.

In order to reset relay R-L by depressing acknowledge button PB1, the power to relay R-L through lines 3, 4 and 5 must be interrupted. This is accomplished by providing time delay relay TDR1 in parallel with indicator light L1 as shown, having a normally closed contact TDR1-a in line 3. The time delay period should be longer than the short closure period for relay R1 but shorter than any expected operator response to depress button PB1. It should also be longer than the probable duration of a test of lights L1, L2 and horn H through depression of test button PB2. Then relay R-L can be reset (deactivated) by depressing PB1.

It would be possible to provide a contact on relay R-L which would not open until R-L-a closes, serving in place of contact TDR1-a. However, then PB1 "acknowledge" would not function. Furthermore, there are usually a number of abnormal condition station contacts with their individual sets of circuitry in each system. Each set has need for a contact similar to TDR1-a. Relay R-L already has one contact in each set and needs three more besides. An additional contact for each set would be too many contacts for one relay and at least two would be needed. They would be more expensive and occupy more space in expensive explosion-proof boxes. Thus, the simple little time delay relay in each circuitry set has obvious advantages and accomplishes things the big or double R-L relay system could not do.

When light L1 is illuminated, relay R-L is simultaneously closed. Relay TDR1 is energized but it delays opening the power circuit to relay R-L through contact TDR1-a for a second or so to allow relay R-L to have available power to close and establish an alternate power circuit through contact R-L-a. Normally closed contact R-L-d opens immediately to interrupt this initial power signal to relay R-L. Without it opening there would be power available from contact R-L-a to line 4, then through other time delay relay contacts, TDR2-a in this case, to the corresponding time delay relays and lights, causing them to blink. When contacts TDR1-a opens it removes the power supply from line 4.

Also shown is a test button PB2, to demonstrate that additional features may be added to the circuitry of the invention without complication. The depression of test button PB2 permits testing of all lights L1, L2, the lock-in circuitry and horn H.

It is believed obvious to those skilled in the art that additional circuits for abnormal conditions could be added as illustrated by the above described second set of circuitry II. The additional circuits would be added on in the same manner that the second one II is added on. Similarly, it is obvious that an alarm system (instead of or in addition to a shutdown system) might be controlled by the invention. Other variations should be obvious to those skilled in the art and it is intended that the scope of the invention be limited only by the claims which follow.

I claim:

1. An annuciator system, operable on A.C. or D. C. current, for indicating the presence of abnormal conditions in a plurality of monitored conditions and, when more than one abnormal condition occurs, indicating which occurred first, comprising: a source of electrical power; a plurality of monitoring circuits for said plurality of monitored conditions connected to said electrical power source; control means in each monitoring circuit responsive on the presence of an abnormal condition associated with its respective circuit to actuate indicator means in said respective circuit; a lock-out circuit commonly connected to said plurality of monitoring circuits and said power source and including lock-out control means responsive on the actuation of one of said indicator means to prevent response of the control means in each of the other monitoring circuits to subsequent abnormal conditions; acknowledgement means in said lock-out circuit, positionable to prevent said response of said lock-out control means so as to allow independent response of all of said monitoring control means to abnormal conditions.

2. An annuciator system as set forth in claim 1 in which said indicator means in each of said monitoring circuits comprises a single indicator device.

3. An annunciator as set forth in claim 1, characterized in that said lock-out control means comprises a relay in series with its own normally closed first contact and in series with a parallel group of normally closed first contacts in each of said monitoring circuits to complete a first circuit from said power source to energize said lockout relay on response of any one of said monitoring circuit control means to an abnormal condition, said lock-out relay having a normally open second contact in parallel with its said first contact closeable on the energization of said relay to connect and lock said relay in a second circuit with said power source, said first relay contact being opened upon said relay energization to prevent power from flowing back to said monitoring circuits through said first circuit.

4. An annunicator as set forth in claim 3, characterized by a time delay relay in each of said monitoring circuits having a normally closed contact in series with said monitoring circuit first contacts, said time delay relays being self-actuating after a selected period of time, from response of its respective monitor control means, to open said time delay relay contact, interrupting power to said lock-out relay through said first circuit.

5. An annunciator as set forth in claim 3, characterized in that said lock-out relay comprises a set of normally open third contacts, one for each of said monitoring circuits, connected to the control means of each monitoring circuit and closeable upon the energization of said lock-out relay to lock all of said monitor control means, except the first to respond to an abnormal condition, in a non-responsive condition.

6. An annunciator as set forth in claim 3, characterized in that said acknowledgement means comprises a switch in series with said lock-out relay and operable to interrupt power to said lock-out relay, unlock said lock-out relay from said second circuit.

7. An annunciator as set forth in claim 3, characterized in that each of said monitor control means comprises a relay in series with its own abnormal condition responsive contact and a power circuit for energization from said power source and which comprises said monitoring circuit first contacts, said monitor relays being deenergizable in response to said presence of an abnormal condition associated with its respective circuit to actuate said indicator means and close its respective said monitoring circuit first contact for said energization of said lock-out relay.

8. An annunciator as set forth in claim 7, characterized in that each of said monitor relays comprises a normally open third contact in series with its respective indicator means and connected to a common line which is connected to said power source through a test switch.

9. An annunciator system for indicating the presence of abnormal conditions in a plurality of monitored conditions and, when more than one abnormal conditions occurs, indicating which occurred first, comprising: an electrical power source, a plurality of monitoring circuits connected to said power source for said plurality of monitored conditions, each comprising a relay responsive on the presence of an abnormal condition associated with its respective circuit to actuate an indicator device in said respective circuit; and a lock-out circuit commonly connected to said power source and each of said monitoring circuits comprising a relay responsive on the response of one of said monitor relays, to an abnormal condition, to prevent response of any other monitor relay to subsequent abnormal conditions; characterized by acknowledgement means in said lock-out circuit actuatable to prevent response of said lock-out relay to any of said monitor relays so as to allow simultaneous independent response of each of said monitor relays and its associated indicator device to an abnormal condition.

10. An annunciator system as set forth in claim 9, characterized in that said lock-out relay comprises a normally closed first contact in series with a parallel group of normally closed monitor first contacts, one on each of said monitor relays, to complete a first circuit from said power source, for actuating said lock-out relay on the said response of one of said monitor relays to an abnormal condition, said lock-out relay having a normally open second contact in parallel with said first contact closeable on actuation of said lock-out relay to connect and lock said lock-out relay in a second circuit with said power source while said first contact is simultaneously opened to break said first circuit.

11. An annunciator system as set forth in claim 10, characterized in that said lock-out relay comprises a set of normally open third contacts, one each in series with each of said monitor relays and connecting its respective monitor relay to said power source on actuation of said lock-out relay to lock all of said monitor relays, except said first responsive one, in a non-responsive condition.

12. An annunciator system as set forth in claim 11, characterized in that each of said monitoring circuits comprises a time delay relay having a normally closed contact in series with its respective monitor first contact, said time delay relays being self-actuatable, after a selected interval of time on response of its respective monitor relay, to interrupt power from said monitor first contact to said lock-out first contact through said first circuit.

13. An annunciator system as set forth in claim 12, characterized in that said acknowledgement means comprises switch means in series with said lock-out relay positionable to interrupt power to said lock-out relay causing said lock-out third contacts to be opened rendering said other monitor relays and their respective indicator devices responsive to abnormal conditions.

14. An annunciator system as set forth in claim 13, characterized in that each of said monitor relays comprises a normally open contact in series with its respective indicator device in a line leading to a common line connected through test switch means to said power source.

15. An annunciator system as set forth in claim 9, characterized in that each of said monitor relays comprises an abnormal condition responsive station contact in series with a normally closed first contact connected to said power source for initial actuation of said monitor relays, each of said monitor relays comprising a normally open second contact in parallel with said first contact and connected to said power source, actuation of said monitor relay simultaneously opening said first contact and closing said second contact to maintain power to said monitor relay until interrupted by response of said station contact to an abnormal condition.

16. An annunciator system as set forth in claim 15, characterized in that said monitor relay comprises a normally closed third contact in parallel with said station contact and said first and second contacts and connected to said power source through one of a set of normally open lock-out contacts on said lock-out relay, said lock-out contacts being closed on said lock-out relay response to connect all except said one monitor relay to said power source through said third contacts, by-passing said station contacts and locking said other monitor relays in a non-responsive condition.

17. An annunciator system as set forth in claim 15, characterized in that said indicator device is connected to said power source through a normally closed third contact on said monitor relay.

18. An annunciator system as set forth in claim 17, characterized in that said monitor relay comprises a normally open fourth contact in parallel with said third contact and through which said indicating device may be connected to said power source through a switch device.

19. An annunciator system as set forth in claim 9 in which said indicator device in each of said respective circuits comprises a single lamp.

20. An annunciator system for indicating the presence of abnormal conditions in a plurality of monitored conditions and, when more than one abnormal condition occurs, indicating which occurred first, comprising: a two terminal power source; a plurality of monitoring circuits connected to said power source, each comprising a relay having an abnormal condition responsive station contact in series with a normally closed first contact connected to said power source for initial actuation of its respective relay and a normally closed second contact in series with an indicating device, said second contact being closed on response of said station contact to an abnormal condition to actuate said indicating device; and a lock-out circuit commonly connected to said power source and each of said monitoring circuits and comprising a relay having a normally closed first contact in series with a parallel group of contacts, comprising said monitor relay second contacts, to complete a first circuit from said power source for actuating said lock-out relay on the said response of one of said station contacts to an abnormal condition, said lock-out relay comprising a set of normally open second contacts, one each in parallel with each of said monitor relay station and first contacts, closeable on actuation of said lock-out relay, by response of one of said monitor relays to an abnormal condition, to connect all of said monitor relays, except said first responsive one, to said power source, locking them in a non-responsive condition; characterized in that each of said monitoring circuits comprises a time delay relay having a normally closed contact in series with its respective monitor relay second contact, the time delay relay associated with said one monitor relay being self-actuatable after a selected interval of time from actuation of said lock-out relay to interrupt power to said lock-out relay through said first circuit.

21. An annunciator system as set forth in claim 20, characterized by acknowledgement switch means in series with said lock-out relay, positionable to interrupt all power to said lock-out relay, opening said lock-out relay second contacts and rendering said other monitor relays responsive to abnormal conditions.

* * * * *

UNITED STATES PATENT OFFICE
CERTIFICATE OF CORRECTION

Patent No. 3,793,633  Dated February 19, 1974

Inventor(s) Leendert A. Beeloo

It is certified that error appears in the above-identified patent and that said Letters Patent are hereby corrected as shown below:

In column 1, line 59, delete "heen" and insert therefor --been--.

In column 3, line 1, delete "faeature" and insert therefor --feature--; delete "inventionrelates" and insert therefor --invention relates--.

In column 3, line 17, delete "feature" and insert therefor --TDR1-a--; delete "inven-".

In column 3, line 18, delete "tion relates" and insert therefor --in--.

In column 5, line 21, Claim 6, delete "unlock" and insert therefor --unlocking--.

In column 5, line 41, Claim 9, delete "conditions" and insert therefor --condition--.

Signed and sealed this 17th day of September 1974.

(SEAL)
Attest:

McCOY M. GIBSON JR.
Attesting Officer

C. MARSHALL DANN
Commissioner of Patents